(12) United States Patent
Uota et al.

(10) Patent No.: US 11,167,385 B2
(45) Date of Patent: Nov. 9, 2021

(54) BALANCER CYLINDER AND WORKPIECE-CONVEYING APPARATUS IN WHICH BALANCER CYLINDER IS USED

(71) Applicant: SMC CORPORATION, Chiyoda-ku (JP)

(72) Inventors: Hiroshi Uota, Tsukubamirai (JP); Takanori Nishi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 116 days.

(21) Appl. No.: 16/641,454

(22) PCT Filed: Aug. 1, 2018

(86) PCT No.: PCT/JP2018/028862
§ 371 (c)(1),
(2) Date: Feb. 24, 2020

(87) PCT Pub. No.: WO2019/044342
PCT Pub. Date: Mar. 7, 2019

(65) Prior Publication Data
US 2021/0138596 A1    May 13, 2021

(30) Foreign Application Priority Data

Aug. 30, 2017    (JP) .............................. JP2017-165116

(51) Int. Cl.
*B23Q 1/26*    (2006.01)
(52) U.S. Cl.
CPC ..................................... *B23Q 1/26* (2013.01)

(58) Field of Classification Search
CPC ...... F15B 15/00; F15B 15/14; F15B 15/1428; F15B 15/26; F15B 15/261;
(Continued)

(56) References Cited

U.S. PATENT DOCUMENTS 3,733,971 A * 5/1973 Sugimoto ............. F15B 15/262
92/26
5,361,680 A    11/1994 Matsui
(Continued)

FOREIGN PATENT DOCUMENTS

| JP | 2006-297504 A | 11/2006 |
|----|---------------|---------|
| JP | 2009-62186 A | 3/2009 |
| WO | WO 2013/051333 A1 | 4/2013 |

OTHER PUBLICATIONS

Office Action dated Mar. 1, 2021 in corresponding Indian Patent Application No. 202047012697 (with English Translation), 5 pages.
(Continued)

*Primary Examiner* — Tyrone V Hall, Jr.
(74) *Attorney, Agent, or Firm* — Oblon, McClelland, Maier & Neustadt, L.L.P.

(57) ABSTRACT

When pressurized fluid is not supplied into or discharged from the first channel 28a of the piston rod 28, that is, when the first channel 28a is isolated from the outside, the cylinder tube 22 is in a stopped state. At this time, fluid inside the first cylinder chamber 36a is compressed, and the pressure is increased accordingly to match the sum of the weights of the cylinder tube 22, the table 18, and the workpiece W.

7 Claims, 10 Drawing Sheets

(58) Field of Classification Search
CPC .. B23Q 11/0017; B23Q 11/0025; B23Q 1/25; B23Q 1/26; B23Q 1/267; B23Q 1/38; B66F 19/00
See application file for complete search history.

(56) References Cited

U.S. PATENT DOCUMENTS

| | | |
|---|---|---|
| 2003/0172652 A1 | 9/2003 | Tohru |
| 2006/0242959 A1 | 11/2006 | Tanizaki et al. |
| 2014/0138890 A1 | 5/2014 | Kawakami |

OTHER PUBLICATIONS

International Search Report dated Oct. 30, 2018 in PCT/JP2018/028862 filed Aug. 1, 2018.

* cited by examiner

BALANCER CYLINDER AND WORKPIECE-CONVEYING APPARATUS IN WHICH BALANCER CYLINDER IS USED

TECHNICAL FIELD

The present invention relates to a balancer cylinder used for, for example, carrying workpieces, and a workpiece carrying apparatus using a balancer cylinder (workpiece-conveying apparatus in which a balancer cylinder is used).

BACKGROUND ART

In production facilities such as automotive factories, balancer cylinders with balance function of counterbalancing the weights of workpieces and hoist and lower function as hoisting machines have been widely used to carry heavy workpieces to desired work areas (see Japanese Laid-Open Patent Publication Nos. 2009-062186 and 2006-297504). Although such balancer cylinders can be driven electrically, pneumatically, by vacuum pumps, hydraulically, and the like, pneumatic balancer cylinders are used in work environment with a potential risk of explosion and fire. For example, a pneumatic balancer cylinder is mounted on a workpiece carrying apparatus such that the axial direction extends vertically, and an operator controls supply and discharge of compressed air to and from a cylinder tube by operating a controller. Since the vertically downward force generated by the sum of the weight of the balancer cylinder and the weight of a workpiece can be counterbalanced or reduced by a vertically upward force generated by supplying compressed air, the operator can lift the workpiece with a small force to carry the workpiece easily.

SUMMARY OF INVENTION

In the above-described balancer cylinder, in a case where a piston rod is secured to the workpiece carrying apparatus and a workpiece is held on the cylinder tube side, the cylinder tube ascends and descends vertically together with the workpiece by the effect of supplied compressed air. Specifically, the cylinder tube ascends when compressed air is supplied into the cylinder tube, stops when the supply of compressed air stops, and descends due to the weight of the balancer cylinder and the weight of the workpiece when compressed air is discharged from inside the cylinder tube. However, if the cylinder tube excessively descends, a piston collides with a rod cover at the end of descending stroke. This may damage the balancer cylinder.

The present invention has the object of providing a balancer cylinder capable of reliably stopping at a position near the end of descending stroke of a cylinder tube and capable of being locked at the stop position, and a workpiece carrying apparatus using such a balancer cylinder.

A balancer cylinder according to the present invention is mounted on a workpiece carrying apparatus including a pressurized fluid supply source, the balancer cylinder being mounted with an axial direction of the balancer cylinder extending vertically, and includes a cylinder tube including a cylinder chamber, both ends of the cylinder chamber being closed by a head cover and a rod cover; a piston configured to partition the cylinder chamber into a first cylinder chamber adjacent to the rod cover and a second cylinder chamber adjacent to the head cover; a piston rod in which a channel connecting the pressurized fluid supply source and the first cylinder chamber to each other is formed, the piston rod including a first end portion connected to the piston, and a plurality of locking grooves formed on an outer circumferential surface of the piston rod; a movable valve provided to be displaceable in the axial direction of the piston rod; and a locking member provided in the movable valve and selectively engaging with one of the locking grooves. At a position near an end of descending stroke of the cylinder tube, when the rod cover comes into contact with the movable valve and moves an engagement position of the locking member from one of the locking grooves to another of the locking grooves, the channel connecting the pressurized fluid supply source and the first cylinder chamber to each other is closed.

The balancer cylinder according to the present invention can reliably stop operating at the position near the end of descending stroke of the cylinder tube and can be locked at the stop position. That is, the cylinder tube can be stopped before reaching the stroke end by changing the position of engagement of the movable valve with the piston rod as the cylinder tube descends and by cutting off the communication between the first cylinder chamber and the pressurized fluid supply source so that the first cylinder chamber is hermetically sealed. This prevents the piston from colliding with the movable valve. In addition, since the piston rod and the cylinder tube can be locked to each other at the stop position, maintenance of the balancer cylinder can be advantageously facilitated.

In the balancer cylinder according to the present invention, the piston may include a pin accommodating hole passing through the piston in the axial direction and a releasing pin accommodated in the pin accommodating hole to be displaceable in the axial direction, and including a first end portion facing the first cylinder chamber and a second end portion facing the second cylinder chamber. The rod cover may include a communication path configured to connect the first cylinder chamber and the pressurized fluid supply source to each other. At a position near an end of ascending stroke of the cylinder tube, due to pressurized fluid supplied from the communication path to the first cylinder chamber, the head cover may push the movable valve via the releasing pin and may move the engagement position of the locking member from the other of the locking grooves to the one of the locking grooves. With this structure, by supplying pressurized fluid (compressed air) from the communication path, the engagement position of the locking member can be returned to a position corresponding to a normal operating state (unlocked state), and the channel can be unblocked. Thus, the cylinder tube can be easily unlocked from the piston rod.

In the balancer cylinder according to the present invention, a second end portion of the piston rod may be secured to a support mechanism constituting the workpiece carrying apparatus. As a result, the cylinder tube is displaced vertically without vertical displacement of the piston rod, whereby a tube or the like of the pressurized fluid supply source does not need to be moved in response to the ascent and descent of the cylinder tube. That is, pressurized fluid can be supplied to and discharged from the piston rod in a stable manner. In addition, in a case where a connection point between the piston rod and the pressurized fluid supply source is disposed in an upper region of the workpiece carrying apparatus, a large work space can be secured around the cylinder tube moving up and down below the support mechanism.

The balancer cylinder according to the present invention may include, between the rod cover and the movable valve, a shock absorbing mechanism configured to absorb shock caused by contact therebetween. With this structure, shock caused by contact with the rod cover can be absorbed by the shock absorbing mechanism to gradually stop the cylinder tube at the position near the end of descending stroke of the cylinder tube, and the cylinder tube can be locked to the piston rod at the stop position.

In the balancer cylinder according to the present invention, the head cover may include an air hole opened in an outer circumferential surface of the head cover to connect the second cylinder chamber to the atmosphere, and a silencing member attached to the air hole and allowing passage of air therethrough. As a result, the air inside the second cylinder chamber is discharged to the atmosphere via the silencing member, whereby the discharge noise can be reduced.

A workpiece carrying apparatus according to the present invention includes a balancer cylinder, a support mechanism configured to support the balancer cylinder with an axial direction of the balancer cylinder extending vertically, a pressurized fluid supply source configured to supply pressurized fluid to the balancer cylinder, a guide configured to guide a vertical operation of a cylinder tube constituting the balancer cylinder, and a workpiece carrying member detachably connected to the cylinder tube. The balancer cylinder includes a cylinder tube including a cylinder chamber, both ends of the cylinder chamber being closed by a head cover and a rod cover; a piston configured to partition the cylinder chamber into a first cylinder chamber adjacent to the rod cover and a second cylinder chamber adjacent to the head cover; a piston rod in which a channel connecting the pressurized fluid supply source and the first cylinder chamber to each other is formed, the piston rod including a first end portion connected to the piston, and a plurality of locking grooves formed on an outer circumferential surface of the piston rod; a movable valve provided to be displaceable in the axial direction of the piston rod; and a locking member provided inside the movable valve and selectively engaging with one of the locking grooves. At a position near an end of descending stroke of the cylinder tube, when the rod cover comes into contact with the movable valve and moves an engagement position of the locking member from one of the locking grooves to another of the locking grooves, the channel connecting the pressurized fluid supply source and the first cylinder chamber to each other is closed.

The workpiece carrying apparatus according to the present invention can reliably stop operating at the position near the end of descending stroke of the cylinder tube and can be locked at the stop position. That is, the cylinder tube constituting the balancer cylinder can be stopped before reaching the stroke end by changing the position of engagement of the movable valve with the piston rod as the cylinder tube descends and by cutting off the communication between the first cylinder chamber and the channel so that the first cylinder chamber is hermetically sealed. This prevents the piston from colliding with the movable valve. In addition, since the piston rod and the cylinder tube can be locked to each other at the stop position, maintenance of the balancer cylinder can be advantageously facilitated. The guide vertically guiding the cylinder tube constituting the balancer cylinder prevents the workpiece carrying member and the workpiece from shaking during ascent and descent of the cylinder tube, resulting in a stable operation. In addition, since the workpiece carrying member is detachably connected to the balancer cylinder, the workpiece carrying apparatus can be used for workpieces with different shapes and sizes.

According to the present invention, it is possible to provide a balancer cylinder capable of reliably stopping at a position near the end of descending stroke of a cylinder tube and capable of being locked at the stop position, and a workpiece carrying apparatus using such a balancer cylinder.

The above-described object, features, and advantages will become more apparent from the following description of preferred embodiments in conjunction with the accompanying drawings.

DESCRIPTION OF EMBODIMENTS

Preferred embodiments of a balancer cylinder according to the present invention will be described in detail below with reference to the accompanying drawings, in relation to a workpiece carrying apparatus using the same.

Figure 1:
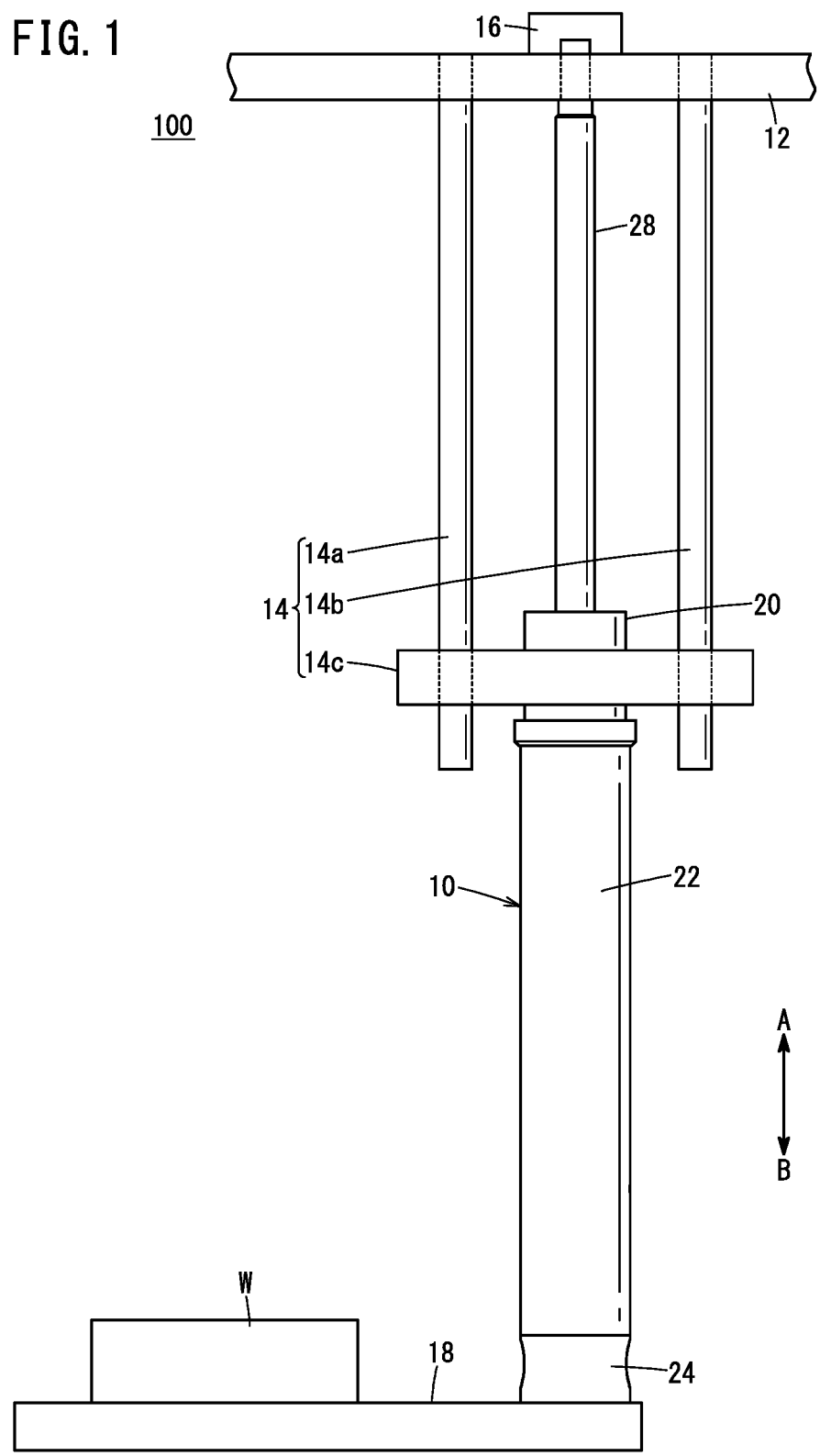
FIG. 1 is an outside view of a workpiece carrying apparatus on which a balancer cylinder according to a first embodiment is mounted.
Figure 2:
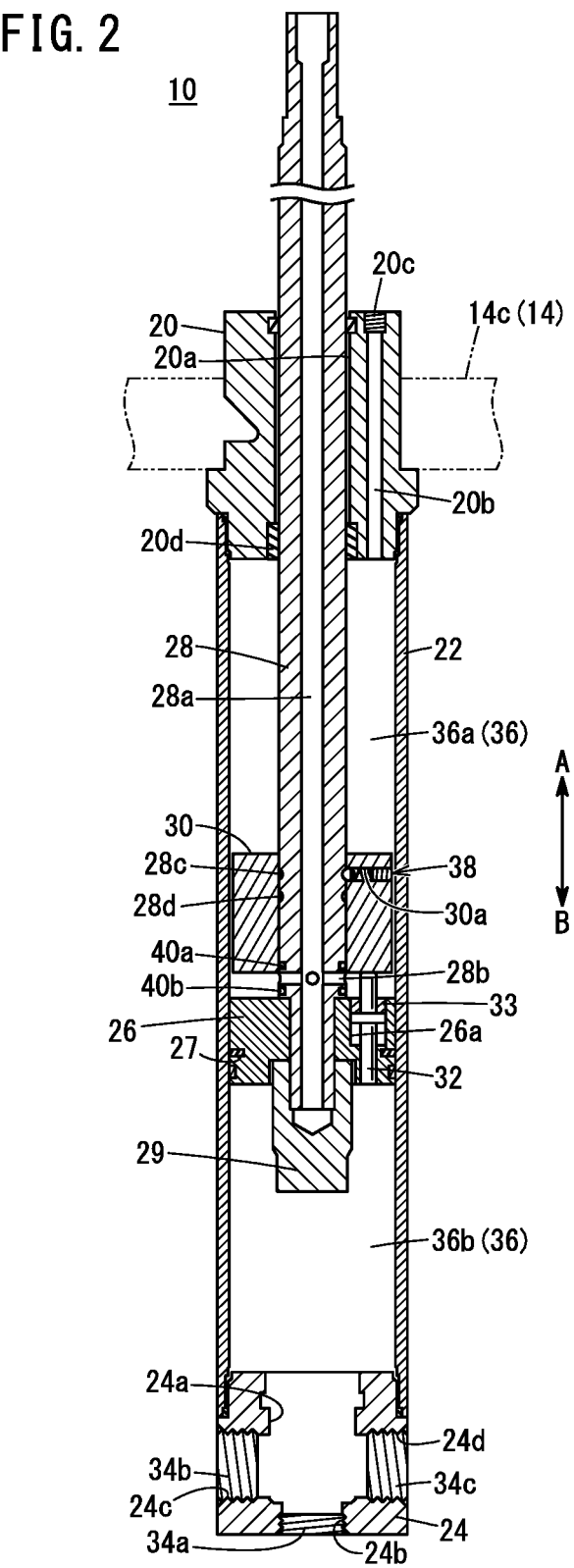
FIG. 2 is a longitudinal sectional view of the balancer cylinder illustrated in FIG. 1 in normal operating state.
Figure 3:
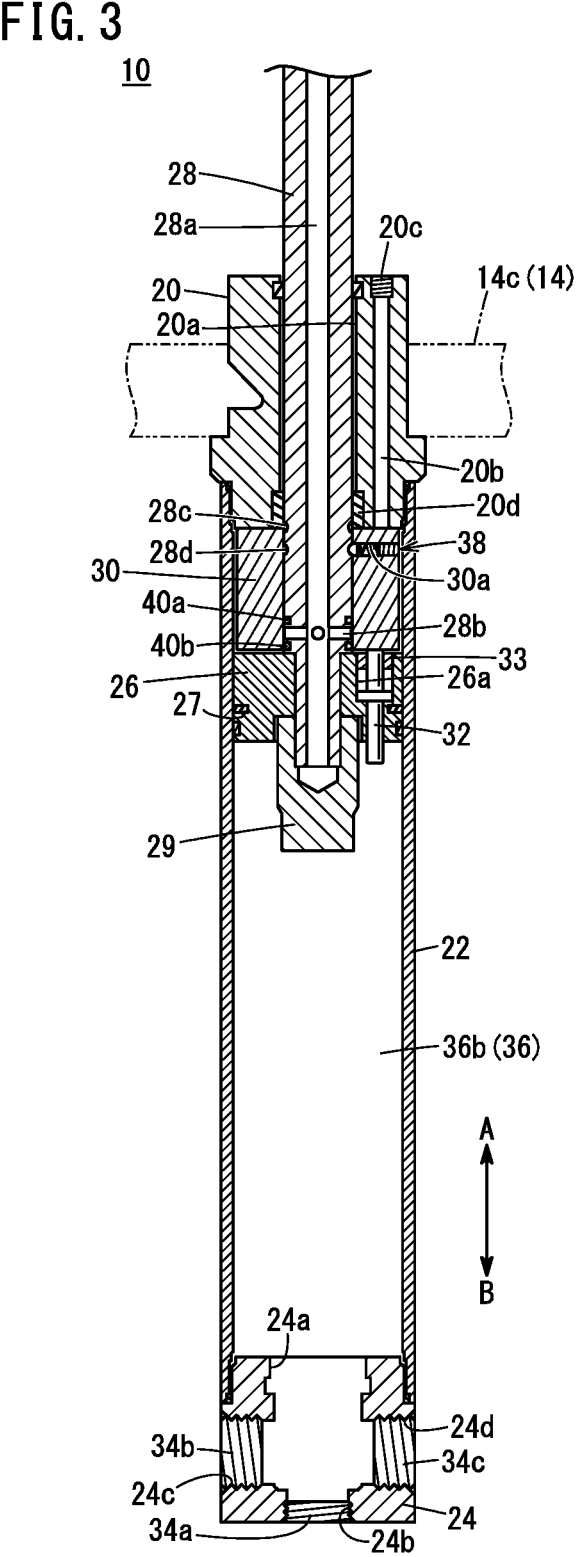
FIG. 3 is a longitudinal sectional view of the balancer cylinder in a locked state when a cylinder tube descends and has reached a position near a stroke end in the balancer cylinder illustrated in FIG. 1.
Figure 4:
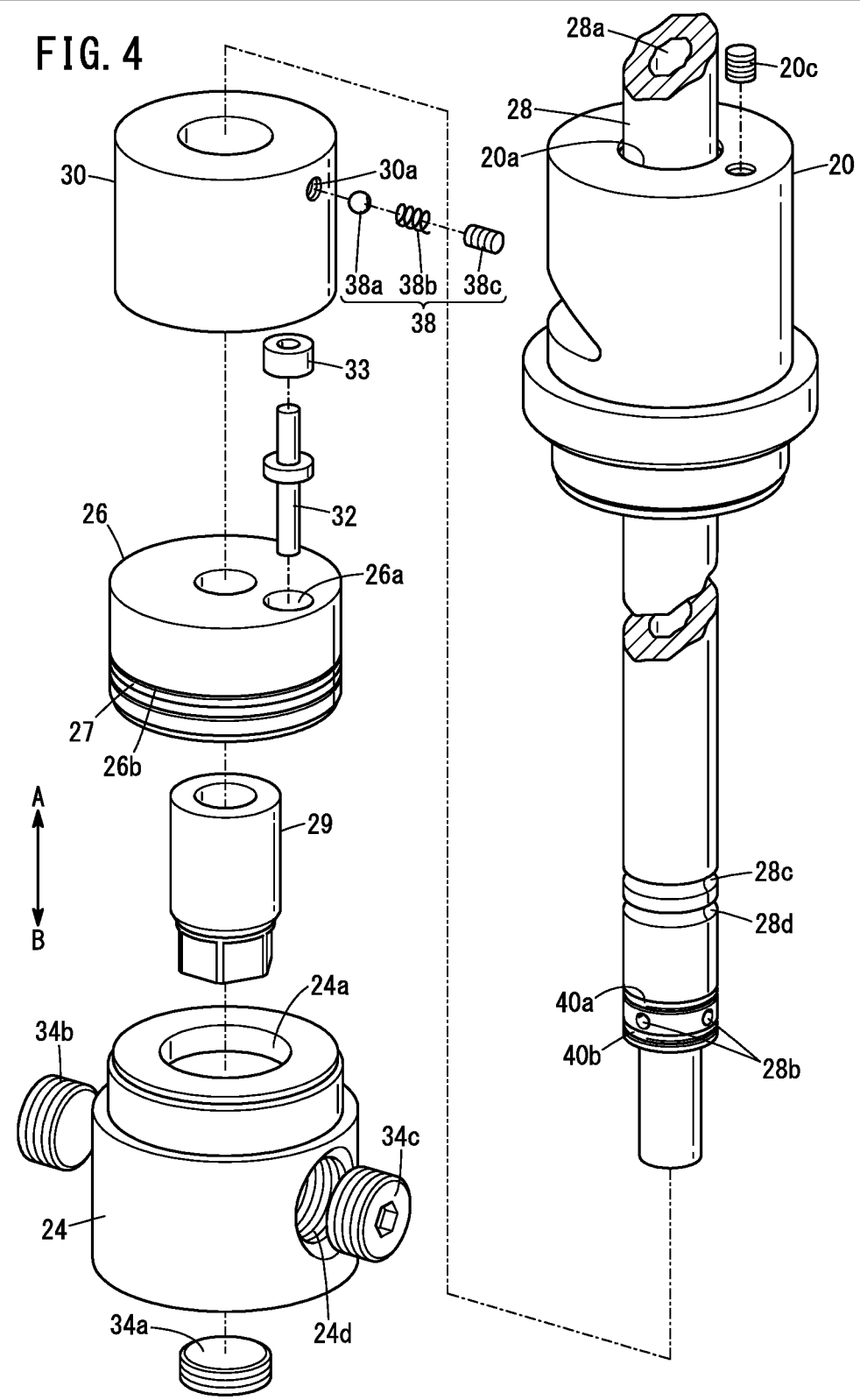
FIG. 4 is a partially omitted exploded perspective view of the balancer cylinder illustrated in FIG. 1.

FIG. 1 is an outside view of a workpiece carrying apparatus 100 on which a balancer cylinder 10 according to a first embodiment is mounted. FIG. 2 is a longitudinal sectional view of the balancer cylinder 10 illustrated in FIG. 1 in normal operating state. FIG. 3 is a longitudinal sectional view of the balancer cylinder 10 in a locked state when a cylinder tube 22 descends and has reached a position near a stroke end in the balancer cylinder 10 illustrated in FIG. 1. FIG. 4 is a partially omitted exploded perspective view of the balancer cylinder 10 illustrated in FIG. 1.

As illustrated in FIG. 1, the workpiece carrying apparatus 100 includes the balancer cylinder 10, a support mechanism 12 disposed in an upper region, a guide 14 accommodating the balancer cylinder 10 inside, a pressurized fluid supply source 16 supplying pressurized fluid (compressed air) to the balancer cylinder 10, and a table 18 on which a workpiece W is placed.

The balancer cylinder 10 is mounted on the support mechanism 12 such that the axial direction thereof extends vertically (directions of arrows A and B in FIG. 1). The guide 14 includes a pair of guide rails 14a and 14b extending vertically and a guiding member 14c. First end portions of the guide rails 14a and 14b are connected to the support mechanism 12, and second end portions pass through the guiding member 14c. The guiding member 14c is connected to a rod cover 20 of the balancer cylinder 10 in an integrated manner and slides along the guide rails 14a and 14b. With this structure, the guide 14 guides the vertical operation of the cylinder tube 22. The pressurized fluid supply source 16 is connected to a piston rod 28 of the balancer cylinder 10. The table 18 is detachably attached to a head cover 24 and is selected according to the size of the workpiece W as appropriate.

As illustrated in FIG. 2, the balancer cylinder 10 includes the rod cover 20, the cylinder tube 22, the head cover 24, a piston 26, the piston rod 28, a movable valve 30, a releasing pin 32, and silencing members 34a to 34c made of, for example, sintered compacts.

The cylinder tube 22 has a cylinder chamber 36 inside, and both ends of the cylinder chamber 36 are closed by the rod cover 20 and the head cover 24. The piston 26 is accommodated in the cylinder chamber 36 and partitions the cylinder chamber 36 into two chambers, that is, a first cylinder chamber 36a and a second cylinder chamber 36b. The piston 26 includes a pin accommodating hole 26a and a packing receiving portion 26b (see FIG. 4).

The pin accommodating hole 26a is a through-hole extending in the axial direction of the piston 26 and shifted from the central axis thereof, and accommodates the releasing pin 32 and an annular pin cover 33. The releasing pin 32 has a first end portion facing the first cylinder chamber 36a, and a second end portion facing the second cylinder chamber 36b. The pin cover 33 closes the pin accommodating hole 26a together with the releasing pin 32 while allowing the releasing pin 32 to be displaced in the axial direction. The packing receiving portion 26b is an annular groove formed in the outer circumferential surface of the piston 26. A piston packing 27 is attached to the packing receiving portion 26b to close a gap between the outer circumferential surface of the piston 26 and the inner wall surface of the cylinder tube 22 (see FIG. 3). Thus, pressurized fluid cannot move between the first cylinder chamber 36a and the second cylinder chamber 36b.

The piston rod 28 has a first end portion connected to the piston 26 via a piston nut 29, and a second end portion secured to the support mechanism 12 constituting the workpiece carrying apparatus 100 (see FIG. 1). The pressurized fluid supply source 16 is connected to a connection point between the support mechanism 12 of the workpiece carrying apparatus 100 and the piston rod 28. Channels allowing passage of pressurized fluid are formed inside the piston rod 28. The channels include a first channel 28a and second channels 28b and connect the pressurized fluid supply source 16 and the first cylinder chamber 36a to each other. The first channel 28a extends in the axial direction (vertical direction) of the cylinder tube 22. The second channels 28b connect the first channel 28a and the first cylinder chamber 36a to each other at positions adjacent to the piston 26. In this embodiment, four second channels 28b are formed at intervals of 90° around the axis to extend radially outward from the central axis of the piston rod 28.

The rod cover 20 includes a rod holding hole 20a and a communication path 20b disposed at a position shifted from the rod holding hole 20a. A first end portion of the communication path 20b is closed by a plug 20c. The rod holding hole 20a passes through the center of the rod cover 20 in the axial direction and holds the piston rod 28 such that the piston rod 28 is movable. The communication path 20b is formed in parallel with the rod holding hole 20a. The plug 20c is detachably attached to the first end portion, that is, the inlet of the communication path 20b close to the atmosphere (direction of the arrow A). When the balancer cylinder 10 is unlocked (described below), the plug 20c is removed, and a tube (not illustrated) of the pressurized fluid supply source 16 is connected to the first end portion of the communication path 20b. An annular packing 20d is attached to an end portion of the rod holding hole 20a on the first cylinder chamber 36a side to close a gap between the piston rod 28 and the rod cover 20.

The head cover 24 has a piston nut accommodating hole 24a and three air holes 24b to 24d. The piston nut accommodating hole 24a communicates with the second cylinder chamber 36b and accommodates the piston nut 29 when the cylinder tube 22 ascends, that is, during relative contraction of the piston rod 28. The air hole 24b is opened in the axial direction, and the air holes 24c and 24d are opened radially. The air holes 24b to 24d communicate with the second cylinder chamber 36b via the piston nut accommodating hole 24a (see FIG. 3).

The movable valve 30 has a cylindrical shape and is fitted on the outer circumference of the piston rod 28. The movable valve 30 is displaceable with respect to the piston rod 28 in the axial direction. A ratchet accommodating hole 30a, which is a through-hole extending a radial direction, is formed in the movable valve 30. The ratchet accommodating hole 30a accommodates a positioning ratchet 38 (described below). A gap through which pressurized fluid can freely move is left between the outer circumference of the movable valve 30 and the inner circumference of the cylinder tube 22.

As illustrated in FIG. 4, the positioning ratchet 38 includes a steel ball 38a, a spring 38b, and a plug 38c and positions the movable valve 30 in relation to the piston rod 28. The steel ball 38a is disposed to face the outer circumferential surface of the piston rod 28. The steel ball 38a is seated on a first end portion of the spring 38b. The plug 38c closes the ratchet accommodating hole 30a from the outside and supports a second end portion of the spring 38b. In the positioning ratchet 38, the steel ball 38a is biased toward the outer circumferential surface of the piston rod 28 using the elastic force of the spring 38b.

A first sealing member 40a and a second sealing member 40b, both having an annular shape, are fitted in annular grooves engraved in the outer circumferential surface of the piston rod 28 to sandwich the second channels 28b from both sides in the axial direction. The first sealing member 40a and the second sealing member 40b close the second channels 28b at a predetermined position inside the movable valve 30 reached by a part of the piston rod 28 as the cylinder tube 22 descends. In this case, a first locking groove 28c and a second locking groove 28d, both being annular grooves, are formed in the outer circumferential surface of the piston rod 28 at positions closer to the rod cover 20 than the second channels 28b and the first sealing member 40a are (see FIG. 4). Thus, when the steel ball 38a of the positioning ratchet 38 is fitted in the first locking groove 28c or the second locking groove 28d, the movable valve 30 is held to the piston rod 28 with a predetermined holding power. The number of locking grooves may be three or more. That is, the positioning ratchet 38 selectively engages with one of the plurality of locking grooves.

Relative positional relationships among the first sealing member 40a, the second sealing member 40b, the second channels 28b, the first locking groove 28c, and the second locking groove 28d in the outer circumferential surface of the piston rod 28 and the length of the movable valve 30 in the axial direction are set such that the balancer cylinder 10 can be switched between "normal operating state (unlocked state)" and "locked state" according to the engagement position of the positioning ratchet 38.

The silencing members 34a to 34c are respectively attached to the air holes 24b to 24d of the head cover 24. The silencing members 34a to 34c are made of sintered metal as described above and allow the passage of fluid (air) therethrough. The silencing members 34a to 34c can reduce the noise caused by fluid discharge.

Next, the operations and effects of the balancer cylinder 10 configured as above will be described in relation to the workpiece carrying apparatus 100. In the normal operating state, the positioning ratchet 38 engages with the first locking groove 28c of the piston rod 28, and only the first sealing member 40a disposed on the upper side is fitted in a gap between the inner circumferential surface of the movable valve 30 and the outer circumferential surface of the piston rod 28. Thus, the second channels 28b of the piston rod 28 communicate with the first cylinder chamber 36a.

When pressurized fluid is not supplied into or discharged from the first channel 28a of the piston rod 28, that is, when the first channel 28a is isolated from the outside, the piston rod 28 is in a stopped state. At this time, fluid inside the first cylinder chamber 36a is compressed, and the pressure is increased accordingly to match the sum of the weights of the cylinder tube 22, the table 18, and the workpiece W.

Figure 5:
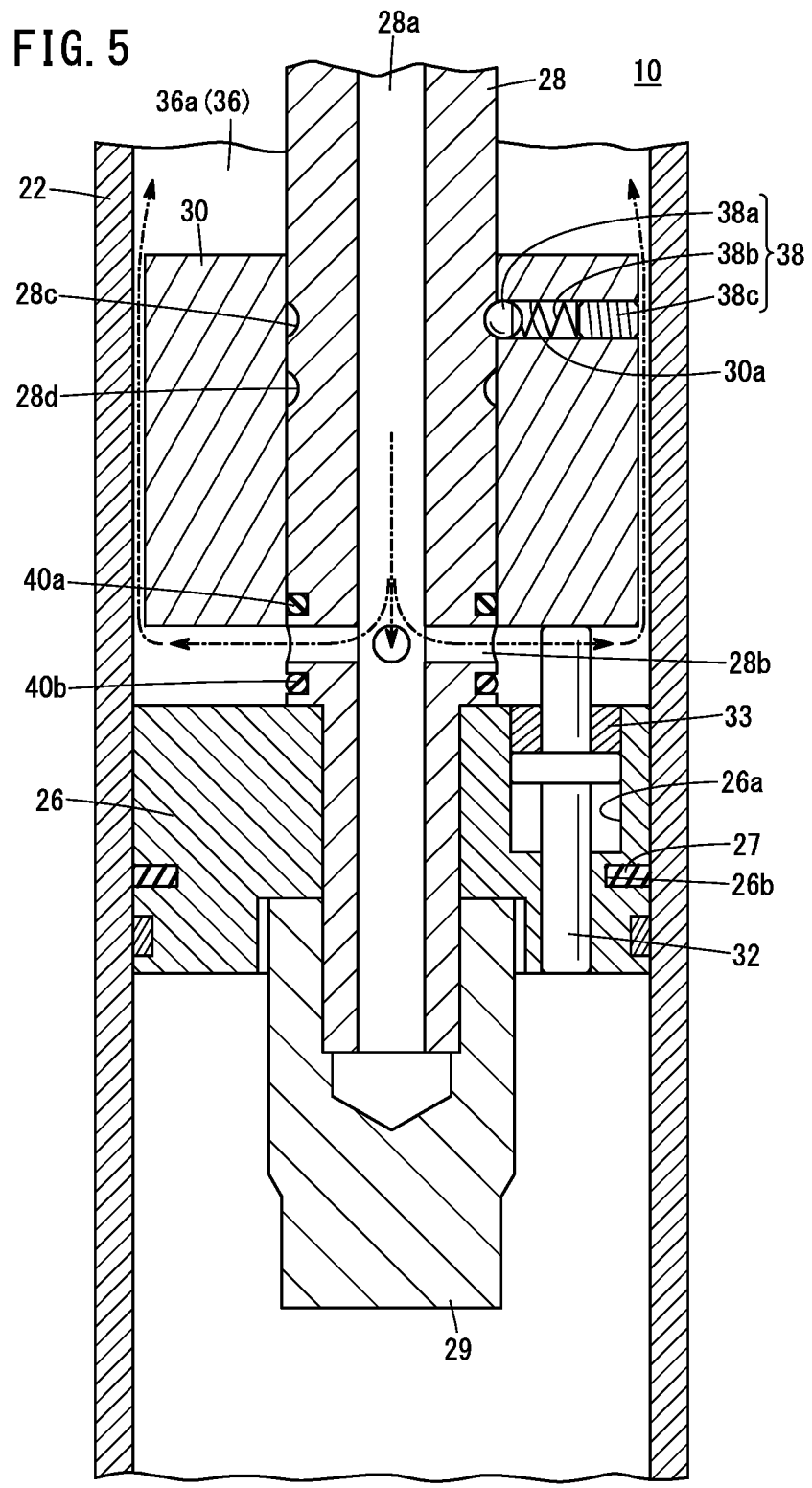
FIG. 5 is a partially omitted enlarged cross-sectional view of the balancer cylinder illustrated in FIG. 2.

To raise the cylinder tube 22 from the stopped state, pressurized fluid is supplied from the pressurized fluid supply source 16 to the first channel 28a of the piston rod 28 as indicated by arrows of alternate long and short dash lines in FIG. 5. Pressurized fluid having passed through the first channel 28a branches at the plurality of second channels 28b and flows into a lower region of the first cylinder chamber 36a sandwiched between the movable valve 30 and the piston 26.

Pressurized fluid flowing into the lower region then flows into an upper region of the first cylinder chamber 36a sandwiched between the movable valve 30 and the rod cover 20 through the gap between the outer circumferential surface of the movable valve 30 and the inner wall surface of the cylinder tube 22.

As pressurized fluid is supplied to the first cylinder chamber 36a, the pressure in the first cylinder chamber 36a increases. As a result, vertically upward thrust is generated in the cylinder tube 22, causing the cylinder tube 22 to ascend. At this moment, the workpiece W connected to the cylinder tube 22 via the head cover 24 also ascends with the cylinder tube 22 and will be, for example, carried.

On the other hand, to lower the cylinder tube 22 from the stopped state, pressurized fluid inside the first cylinder chamber 36a is opened to the atmosphere via the first channel 28a, the second channels 28b, and a valve (not illustrated). As a result, the pressure in the first cylinder chamber 36a decreases, causing the cylinder tube 22 to descend under its own weight.

The cylinder tube 22 can be stopped, raised, and lowered as described above by, for example, an operator controlling supply and discharge of pressurized fluid using a controller (not illustrated) as he/she visually checks the position of the workpiece W. In this case, to stop the cylinder tube 22 at a desired height, the operator stops supplying and discharging pressurized fluid when the cylinder tube 22 has reached the position.

Next, locking of the balancer cylinder 10 in a case where the cylinder tube 22 excessively descends will be described. For example, if an operator excessively performs an operation of discharging pressurized fluid during working with a heavy workpiece W being placed on the table 18, the cylinder tube 22 descends until the movable valve 30 comes into contact with the rod cover 20. This contact causes the steel ball 38a of the positioning ratchet 38 to be pushed back and separated from the first locking groove 28c. As a result, the locked state is released, and the movable valve 30 is displaced vertically downward with respect to the piston rod 28 and the steel ball 38a is fitted in the second locking groove 28d. That is, the cylinder tube 22 is prevented from being displaced further downward.

Figure 6:
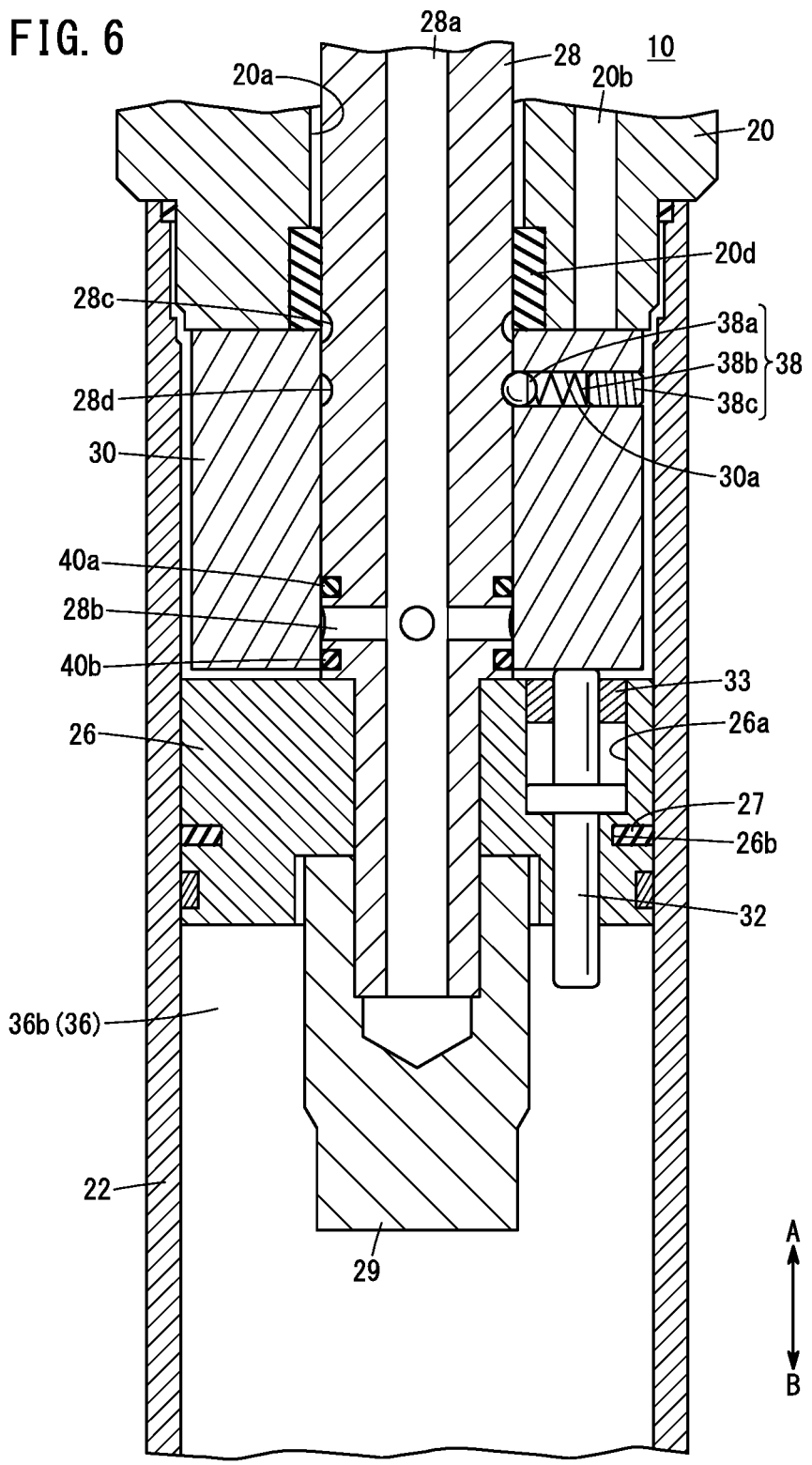
FIG. 6 is a partially omitted enlarged cross-sectional view of the balancer cylinder illustrated in FIG. 3.

FIG. 6 is a partially omitted enlarged cross-sectional view of the balancer cylinder 10 illustrated in FIG. 3, and illustrates the locked state near the end of descending stroke of the cylinder tube 22. As illustrated in FIG. 6, in the locked state, the positioning ratchet 38 is locked in the second locking groove 28d. As the engagement position of the positioning ratchet 38 changes in this manner, the first sealing member 40a and the second sealing member 40b are disposed in the gap between the movable valve 30 and the piston rod 28. As a result, the second channels 28b are closed, bringing the balancer cylinder 10 into the locked state. The position at which the balancer cylinder 10 is brought into the locked state is determined by the positional relationships among the second locking groove 28d, the second channels 28b, the first sealing member 40a, and the second sealing member 40b in the axial direction of the piston rod 28, and the piston 26 and the movable valve 30 are separated from each other at the position. In this manner, in a case where the cylinder tube 22 excessively descends, the movable valve 30 collides with the rod cover 20 and engages with the piston rod 28 at a different position, causing discharge of pressurized fluid to automatically stop. That is, by blocking the flow of pressurized fluid from the first cylinder chamber 36a to the second channels 28b, the first cylinder chamber 36a is hermetically sealed, whereby the cylinder tube 22 is prevented from being further displaced with respect to the piston rod 28. As a result, the cylinder tube 22 reliably stops at the position near the end of descending stroke, that is, before reaching the stroke end. Thus, the piston 26 does not collide with the movable valve 30 and can avoid receiving an excessive load. Note that when the balancer cylinder 10 is locked, the second end portion of the releasing pin 32 protrudes vertically downward (direction of the arrow B) from the bottom surface of the piston 26, and is used to unlock the balancer cylinder 10 described below.

Finally, unlocking from the above-described state will be described. To unlock the balancer cylinder 10 to enable supply and discharge of pressurized fluid by the operator again, first, the plug 20c illustrated in FIG. 3 is removed from the rod cover 20 to open the first cylinder chamber 36a to the atmosphere so that the cylinder tube 22 becomes able to ascend.

Next, a tube (not illustrated) of the pressurized fluid supply source 16 is connected to the first end side, that is, the inlet of the communication path 20b close to the atmosphere (direction of the arrow A), and then supply of pressurized fluid is started. As a result, the pressurized fluid is supplied to the first cylinder chamber 36a via the communication path 20b, and the cylinder tube 22 ascends while the balancer cylinder 10 is locked.

Figure 7:
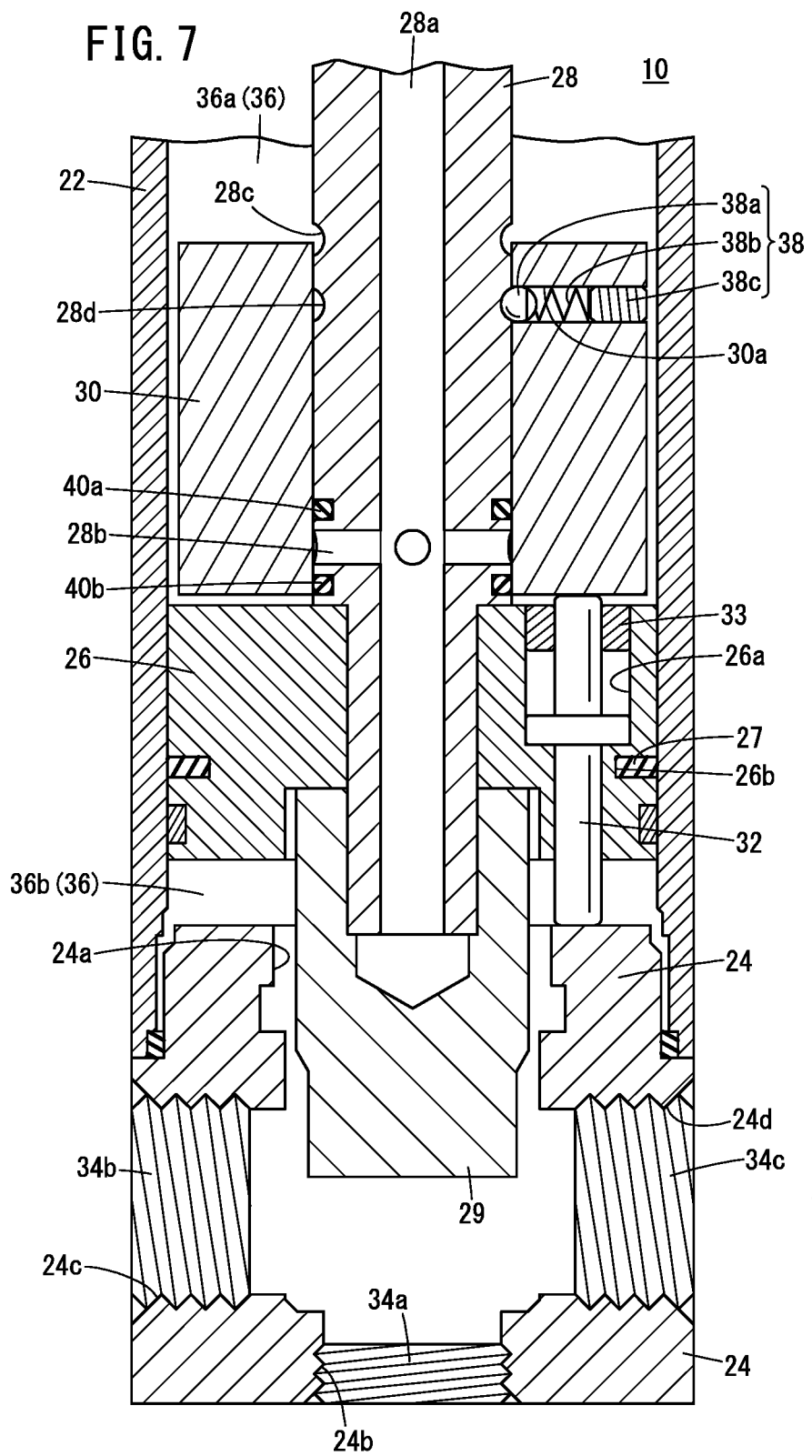
FIG. 7 is a partially omitted enlarged cross-sectional view of the balancer cylinder illustrated in FIG. 3 immediately before the balancer cylinder is unlocked.

FIG. 7 is a partially omitted enlarged cross-sectional view illustrating a state immediately before the balancer cylinder 10 illustrated in FIG. 3 is unlocked. When the cylinder tube 22 continues to ascend while the balancer cylinder 10 is locked, the cylinder tube 22 reaches a position near the end of ascending stroke as illustrated in FIG. 7. At this time, the second end portion of the releasing pin 32 protruding from the bottom surface of the piston 26 comes into contact with the head cover 24. As a result, the head cover 24 pushes the second end portion of the releasing pin 32 vertically upward (direction of the arrow A). This causes the first end portion of the releasing pin 32 to protrude vertically upward from the top surface of the piston 26, and pushes the movable valve 30 toward the rod cover 20. Thus, contrary to locking, the movable valve 30 is displaced vertically upward with respect to the piston rod 28, and the steel ball 38a constituting the positioning ratchet 38 is separated from the second locking groove 28d and fitted in the first locking groove 28c. Consequently, the second channels 28b communicate with the first cylinder chamber 36a again and, as a result, the balancer cylinder 10 is unlocked.

In this manner, the balancer cylinder 10 according to this embodiment can reliably stop operating at the position near the end of descending stroke of the cylinder tube 22 and can be locked at the stop position. That is, the cylinder tube 22 can be stopped before reaching the stroke end by changing the position of engagement of the movable valve 30 with the piston rod 28 as the cylinder tube 22 descends and by cutting off the communication between the first cylinder chamber 36a and the second channels 28b so that the first cylinder chamber 36a is hermetically sealed. This prevents the piston 26 from colliding with the movable valve 30. In addition, since the piston rod 28 and the cylinder tube 22 can be locked to each other at the stop position, maintenance of the balancer cylinder 10 can be advantageously facilitated.

Moreover, in the balancer cylinder 10 according to this embodiment, the piston 26 includes the pin accommodating hole 26a passing therethrough in the axial direction and the releasing pin 32 accommodated in the pin accommodating hole 26a to be displaceable in the axial direction. The releasing pin 32 is provided with the first end portion facing the first cylinder chamber 36a and the second end portion facing the second cylinder chamber 36b. The rod cover 20 includes the communication path 20b capable of connecting the first cylinder chamber 36a and the pressurized fluid supply source 16 to each other. At the position near the end of ascending stroke of the cylinder tube 22, due to pressurized fluid supplied from the communication path 20b to the first cylinder chamber 36a, the head cover 24 pushes the movable valve 30 via the releasing pin 32 and moves the engagement position of the positioning ratchet 38 (locking member) from the second locking groove 28d to the first locking groove 28c. That is, by supplying pressurized fluid from the communication path 20b, the engagement position of the positioning ratchet 38 (locking member) can be returned to a position (first locking groove 28c) corresponding to the normal operating state (unlocked state), and the second channels 28b can be unblocked. Thus, the cylinder tube 22 can be easily unlocked from the piston rod 28.

Furthermore, in the balancer cylinder 10 according to this embodiment, the second end portion of the piston rod 28 is secured to the support mechanism 12 constituting the workpiece carrying apparatus 100. As a result, the cylinder tube 22 is displaced vertically without vertical displacement of the piston rod 28, whereby the tube (not illustrated) of the pressurized fluid supply source 16 does not need to be moved in response to the ascent and descent of the cylinder tube 22. That is, pressurized fluid can be supplied to and discharged from the piston rod 28 in a stable manner. In addition, in the case where the connection point between the piston rod 28 and the pressurized fluid supply source 16 is disposed in the upper region of the workpiece carrying apparatus 100 as illustrated in FIG. 1, a large work space can be secured around the cylinder tube 22 moving up and down below the support mechanism 12.

Yet moreover, the head cover 24 of the balancer cylinder 10 according to this embodiment includes the air holes 24b to 24d, opened in the outer circumferential surface of the head cover 24 to connect the second cylinder chamber 36b to the atmosphere, and the silencing members 34a to 34c respectively attached to the air holes 24b to 24d and allowing passage of air therethrough. As a result, the air inside the second cylinder chamber 36b is discharged to the atmosphere via the silencing members 34a to 34c, whereby the discharge noise can be reduced.

Yet moreover, the workpiece carrying apparatus 100, on which the balancer cylinder 10 according to this embodiment is mounted, includes the guide 14 vertically guiding the cylinder tube 22 constituting the balancer cylinder 10. Thus, the table 18 and the workpiece W are prevented from shaking during ascent and descent of the cylinder tube 22, resulting in a stable operation. Furthermore, the table 18 serving as a workpiece carrying member is detachably connected to the cylinder tube 22 of the balancer cylinder 10 via the head cover 24, and thus can be selected according to the size of the workpiece W. To hang the workpiece W to carry, a workpiece carrying member with a hook shape, for example, may be attached to the balancer cylinder 10 instead of the table 18. The workpiece carrying member can be selected according to the shape and size of the workpiece W.

Next, a balancer cylinder 50 according to a second embodiment will be described. In the description below, the same reference numerals and symbols are used for components identical to those in the balancer cylinder 10 according to the first embodiment described above, and the detailed descriptions will be omitted.

Figure 8:
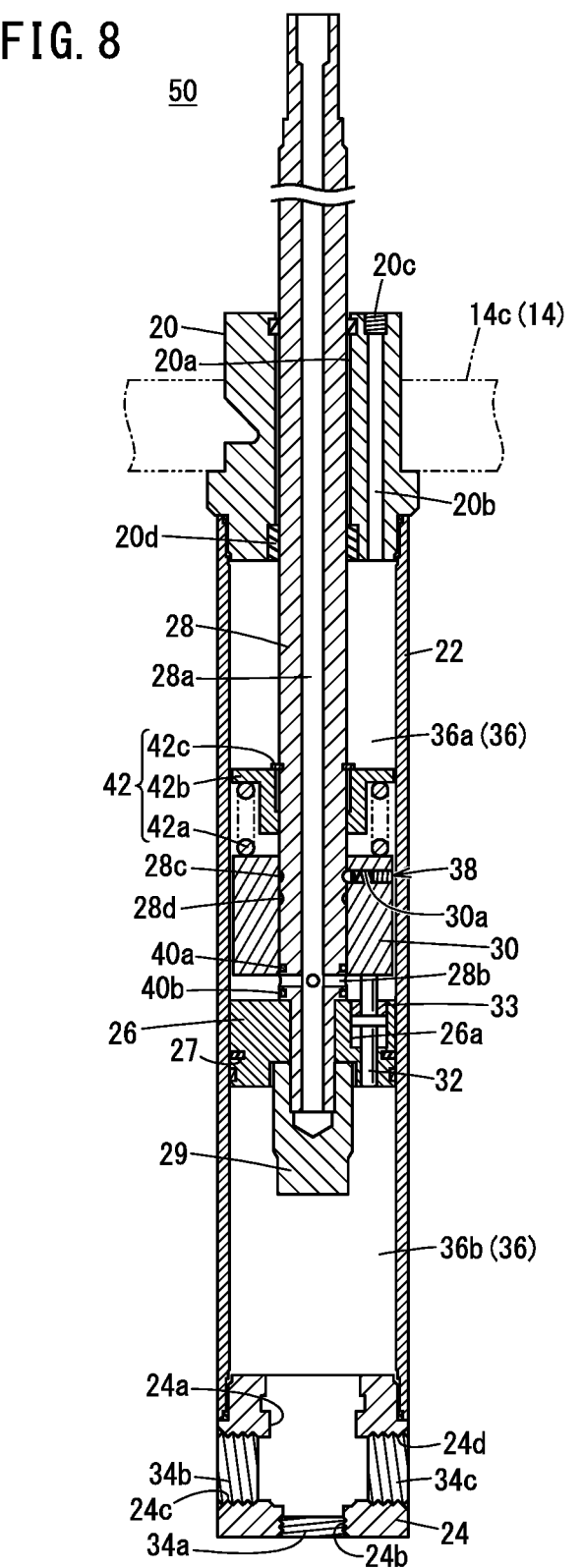
FIG. 8 is a longitudinal sectional view of a balancer cylinder according to a second embodiment in normal operating state.
Figure 9:
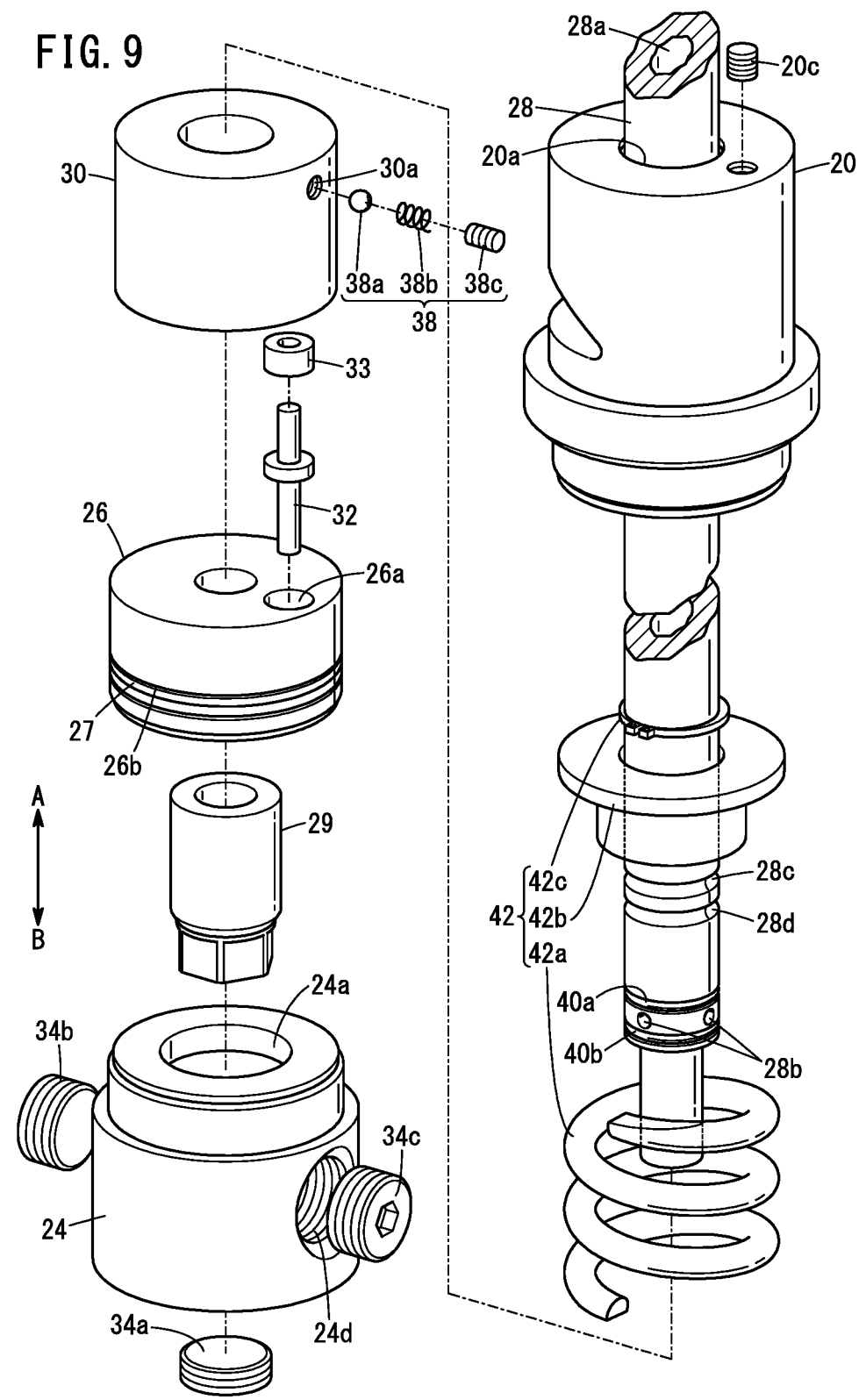
FIG. 9 is a partially omitted exploded perspective view of the balancer cylinder illustrated in FIG. 8.

FIG. 8 is a longitudinal sectional view of the balancer cylinder 50 according to the second embodiment in normal operating state. FIG. 9 is a partially omitted exploded perspective view of the balancer cylinder 50 illustrated in FIG. 8. As illustrated in FIGS. 8 and 9, the balancer cylinder 50 according to this embodiment differs from the balancer cylinder in the above-described first embodiment in that it includes, between the rod cover 20 and the movable valve 30, a shock absorbing mechanism 42 for absorbing shock caused by contact therebetween. The shock absorbing mechanism 42 includes a spring 42a serving as an elastic member, a spring retainer 42b supporting a first end portion of the spring 42a, and a snap ring 42c positioning the spring retainer 42b at a predetermined position in the axial direction. The first end portion of the spring 42a is seated on a flange portion of the spring retainer 42b, and a second end portion thereof is seated on one surface of the movable valve 30. The snap ring 42c is fitted in an annular groove engraved in the outer circumferential surface of the piston rod 28 to prevent the spring retainer 42b from moving.

Figure 10:
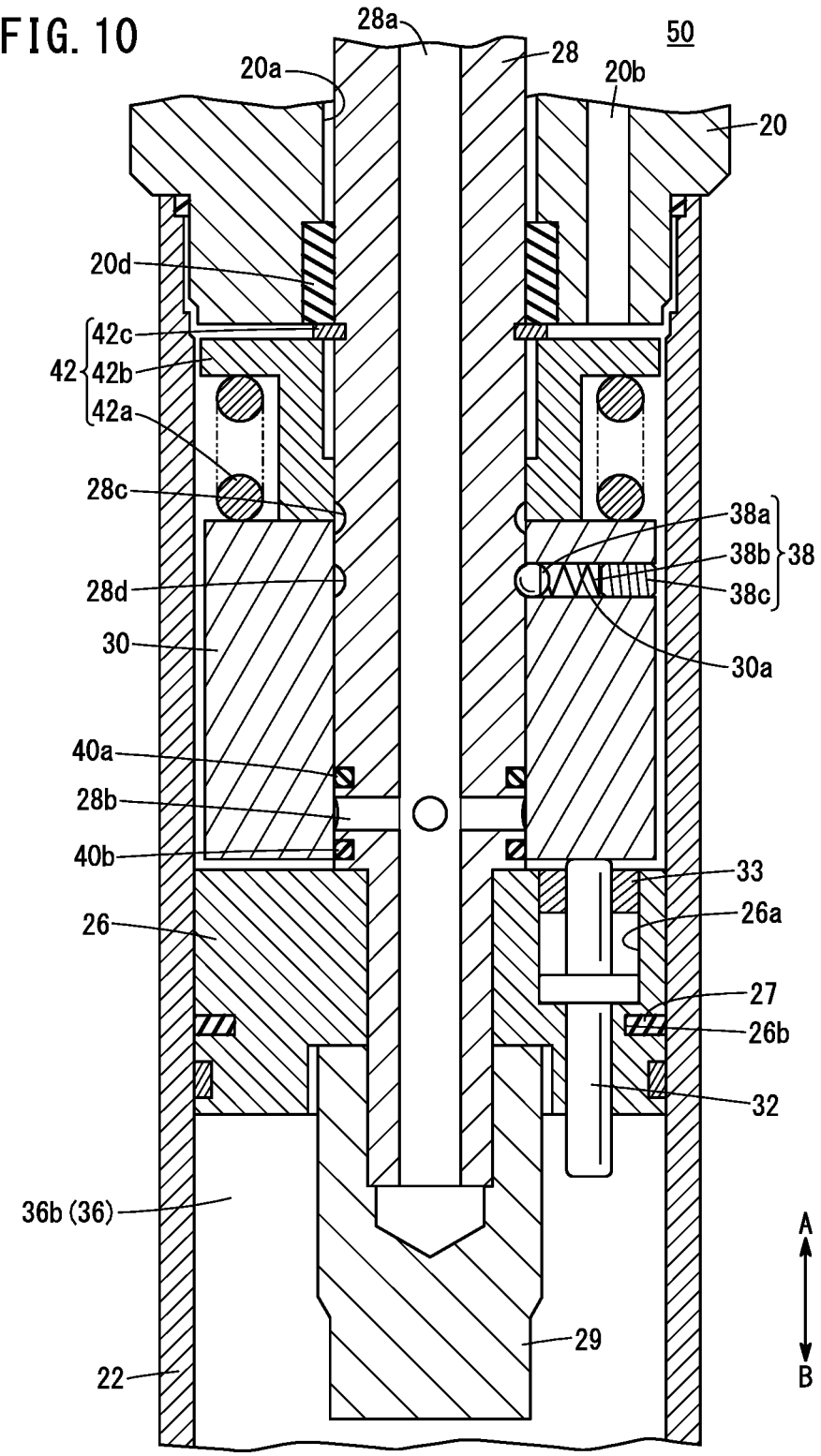
FIG. 10 is a partially omitted enlarged cross-sectional view of the balancer cylinder in a locked state when the cylinder tube descends and has reached a position near a stroke end in the balancer cylinder illustrated in FIG. 8.

Locking of the balancer cylinder 50 will now be described. FIG. 10 is a partially omitted enlarged cross-sectional view of the balancer cylinder 50 in a locked state when the cylinder tube 22 descends and has reached a position near a stroke end in the balancer cylinder 50 illustrated in FIG. 8. For example, if an operator performs an operation of discharging pressurized fluid and the cylinder tube 22 excessively descends while a heavy workpiece W is placed on the table 18, the snap ring 42c of the shock absorbing mechanism 42 comes into contact with the packing 20d fitted in the rod holding hole 20a of the rod cover 20. If the cylinder tube 22 further descends, the spring 42a elastically deforms to contract, and a second end portion of the spring retainer 42b is seated on the one surface of the movable valve 30. The descent speed of the cylinder tube 22 is decelerated by the elastic force of the spring 42a.

If the movable valve 30 comes into contact with the shock absorbing mechanism 42 with a force exceeding a predetermined level, the steel ball 38a of the positioning ratchet 38 is pushed back and separated from the first locking groove 28c. If the movable valve 30 further moves vertically downward, the steel ball 38a is fitted in the second locking groove 28d. At this time, since the first sealing member 40a and the second sealing member 40b lie in the gap between the inner circumferential surface of the movable valve 30 and the outer circumferential surface of the piston rod 28, the communication between the first cylinder chamber 36a and the second channels 28b is cut off, and the first cylinder chamber 36a is hermetically sealed. As a result, the cylinder tube 22 stops before reaching the end of descending stroke and is locked at the stop position.

In this manner, in accordance with the balancer cylinder 50 according to this embodiment, shock caused by contact with the rod cover 20 can be absorbed by the shock absorbing mechanism 42 to gradually stop the cylinder tube 22 at the position near the end of descending stroke of the cylinder tube 22, and the cylinder tube 22 can be locked to the piston rod 28 at the stop position.

The balancer cylinder according to the present invention is not limited in particular to the embodiments described above, and may take various configurations without departing from the scope of the present invention as a matter of course. For example, in the above-described embodiments, the piston rod 28 is secured to the support mechanism 12 constituting the workpiece carrying apparatus 100. Instead, the cylinder tube 22 may be secured to the support mechanism 12, and the workpiece W may ascend and descend with the piston rod 28.

The invention claimed is:

1. A balancer cylinder mounted on a workpiece carrying apparatus including a pressurized fluid supply source, the balancer cylinder being mounted with an axial direction of the balancer cylinder extending vertically, the balancer cylinder comprising:
    a cylinder tube including a cylinder chamber, both ends of the cylinder chamber being closed by a head cover and a rod cover;
    a piston configured to partition the cylinder chamber into a first cylinder chamber adjacent to the rod cover and a second cylinder chamber adjacent to the head cover;
    a piston rod in which a channel connects the pressurized fluid supply source and the first cylinder chamber to each other, the piston rod including a first end portion connected to the piston, and a plurality of locking grooves formed on an outer circumferential surface of the piston rod;
    a movable valve provided to be displaceable in the axial direction of the piston rod; and
    a locking member provided in the movable valve and selectively engaging with one of the locking grooves, wherein
    at a position near an end of descending stroke of the cylinder tube, when the rod cover comes into contact with the movable valve and moves an engagement position of the locking member from one of the locking grooves to another of the locking grooves, the channel connecting the pressurized fluid supply source and the first cylinder chamber to each other is closed.

2. The balancer cylinder according to claim 1, wherein the piston includes:

a pin accommodating hole passing through the piston in the axial direction; and
    a releasing pin accommodated in the pin accommodating hole to be displaceable in the axial direction, and including a first end portion facing the first cylinder chamber and a second end portion facing the second cylinder chamber,
    the rod cover includes a communication path configured to connect the first cylinder chamber and the pressurized fluid supply source to each other, and
    at a position near an end of ascending stroke of the cylinder tube, due to pressurized fluid supplied from the communication path to the first cylinder chamber, the head cover pushes the movable valve via the releasing pin and moves the engagement position of the locking member from the other of the locking grooves to the one of the locking grooves.

3. The balancer cylinder according to claim 1, wherein a second end portion of the piston rod is secured to a support mechanism constituting the workpiece carrying apparatus.

4. The balancer cylinder according to claim 1, further comprising, between the rod cover and the movable valve, a shock absorbing mechanism configured to absorb shock caused by contact therebetween.

5. The balancer cylinder according to claim 1, wherein the head cover includes:
    an air hole opened in an outer circumferential surface of the head cover to connect the second cylinder chamber to an atmosphere; and
    a silencing member attached to the air hole and allowing passage of air therethrough.

6. The balancer cylinder according to claim 1, wherein the movable valve is fitted on the piston rod in the first cylinder chamber,
    the piston rod includes a plurality of sealing members configured to seal a gap between the outer circumferential surface of the piston rod and an inner circumferential surface of the movable valve, and
    the plurality of sealing members include:
    a first sealing member disposed at a position farther from the piston than is an opening of the channel adjacent to the first cylinder chamber; and
    a second sealing member disposed at a position closer to the piston than is the opening of the channel adjacent to the first cylinder chamber.

7. A workpiece carrying apparatus comprising:
    a balancer cylinder;
    a support mechanism configured to support the balancer cylinder with an axial direction of the balancer cylinder extending vertically;
    a pressurized fluid supply source configured to supply pressurized fluid to the balancer cylinder;
    a guide configured to guide a vertical operation of a cylinder tube constituting the balancer cylinder; and
    a workpiece carrying member detachably connected to the cylinder tube, wherein
    the balancer cylinder includes:
    the cylinder tube including a cylinder chamber, both ends of the cylinder chamber being closed by a head cover and a rod cover;
    a piston configured to partition the cylinder chamber into a first cylinder chamber adjacent to the rod cover and a second cylinder chamber adjacent to the head cover;
    a piston rod in which a channel connects the pressurized fluid supply source and the first cylinder chamber to each other, the piston rod including a first end portion connected to the piston, and a plurality of locking grooves formed on an outer circumferential surface of the piston rod;

a movable valve provided to be displaceable in the axial direction of the piston rod; and a locking member provided inside the movable valve and selectively engaging with one of the locking grooves, and wherein at a position near an end of descending stroke of the cylinder tube, when the rod cover comes into contact with the movable valve and moves an engagement position of the locking member from one of the locking grooves to another of the locking grooves, the channel connecting the pressurized fluid supply source and the first cylinder chamber to each other is closed.

* * * * *